(12) United States Patent
Richter et al.

(10) Patent No.: US 7,411,171 B2
(45) Date of Patent: Aug. 12, 2008

(54) CIRCUIT FOR ANALYZING A SIGNAL REFLECTED FROM AN OBJECT

(75) Inventors: Andres Richter, Pforzheim (DE);
Stefan Grohmann, Bretzfeld (DE); Jörg Lummerzheim, Lautertal (DE)

(73) Assignee: ME-IN GmbH, Karlsruhe (DE)

( * ) Notice: Subject to any disclaimer, the term of this patent is extended or adjusted under 35 U.S.C. 154(b) by 11 days.

(21) Appl. No.: 11/441,430

(22) Filed: May 25, 2006

(65) Prior Publication Data
US 2006/0214091 A1 Sep. 28, 2006

Related U.S. Application Data

(63) Continuation-in-part of application No. PCT/DE03/03986, filed on Dec. 3, 2003.

(51) Int. Cl.
*G01J 1/44* (2006.01)
*H01J 40/14* (2006.01)
*H03F 3/08* (2006.01)

(52) U.S. Cl. ............................. 250/214 R; 250/214.1; 250/559.29; 356/482

(58) Field of Classification Search .............. 250/214.1, 250/214 R, 214 A, 214 DC, 214 C, 221, 559.4, 250/559.29, 559.27, 222.1, 234, 201.9; 356/9, 356/11, 482; 340/555–557
See application file for complete search history.

(56) References Cited

U.S. PATENT DOCUMENTS 4,068,222 A * 1/1978 Treviranus .................. 340/556
6,900,449 B2 * 5/2005 Bolash et al. ........... 250/559.16

* cited by examiner

*Primary Examiner*—Georgia Y. Epps
*Assistant Examiner*—Francis M Legasse, Jr.
(74) *Attorney, Agent, or Firm*—Klaus J. Bach

(57) ABSTRACT

In a circuit arrangement for analyzing a clocked signal reflected from an object, particularly an optical signal, wherein at least one radiation emitter which, for providing the clocked signal, is connected to a clocking signal generator, and at least one radiation receiver which receives radiation pulses emitted by the radiation emitter and reflected from the object, and a comparator by which the output signal pulses of the radiation are compared with reference pulses whose amplitudes depend on output signals of the comparator, are provided, the reference signal pulses occur concurrently with the radiation impulses received by the radiation receiver and the impulses received by the radiation receiver are compensated for each by a respective internal reference impulse before their analysis in the circuit arrangement.

6 Claims, 6 Drawing Sheets

CIRCUIT FOR ANALYZING A SIGNAL REFLECTED FROM AN OBJECT

This is a continuation-in-part application of international application PCT/DE2003/003986 which was filed Dec. 3, 2003 and is still pending.

BACKGROUND OF THE INVENTION

The invention resides in a circuit arrangement for analyzing a clocked signal reflected from an object, particularly an optical signal, including at least one radiation emitter which is connected to an oscillator for the delivery of the clocked signal, at least a radiation receiver which receives radiation pulses delivered by the radiation emitter and reflected from the object, and a comparator by means of which the output signal pulses of the radiation receiver are compared with reference signal pulses, wherein the amplitude of the reference signal pulses depends on the output signal of the comparator.

Such a circuit arrangement is known, for example, from DE 100 01 943 A1. In the known arrangement, a clocked optical signal sent out by a radiation emitter and reflected by an object is received by a radiation receiver. The radiation receiver further receives directly a blocked optical signal which is sent out by a second radiation emitter and which is phase-shifted relative to the optical radiation signal sent out by the first radiation emitter by 180°. This means that, whenever there is a gap between the signal sent out by the first radiation emitter and reflected from the object, the radiation receiver receives a radiation pulse of the second radiation emitter.

The signal development present at the output of the radiation receiver depends therefore on the height of the amplitude of the received signal. If the amplitude received by the radiation receiver of the signal of the first radiation emitter reflected by the object is as large as the amplitude of the signal of the second radiation emitter received by the radiation receiver, the radiation receiver delivers at its output a DC voltage.

If the distance of the object from the first radiation emitter or, respectively, the radiation receiver changes, also the amplitude of the signal of the first radiation emitter reflected from the object and received by the radiation receiver changes. As a result, a rectangular voltage is provided at the output of the radiation receiver. In a circuit arrangement connected to the radiation receiver, a control voltage is formed from this rectangular voltage by way of which the strength of pulses emitted from the second radiation emitter is set.

The circuit arrangement is so designed that the control value counteracts the difference between the amplitudes of the reflected signal and the reference signal. That is, the amplitude of the reference signal is adapted to the amplitude of the reflected signal so that the square voltage present at the output of the radiation receiver is almost zero.

In the known circuit arrangement, it is a disadvantage that a second radiation emitter is required and that the light emitted by the second radiation emitter becomes stronger when the reflection is improved, that is, when the reflected light received by the radiation receiver becomes stronger. As a result, the energy requirements are relatively high.

From U.S. Pat. No. 4,068,222 A, a circuit arrangement for the automatic level adjustment for optical sensors with pulsed radiation for example for surveillance apparatus is known in which, by means of changes in the radiation conditions between a pulsed IR emitter and an IR receiver whose clocked output amplitude is adjustable in accordance with emission pulses, alarm signals are generated and the adjustable receiver output signal voltage is compared with the reference signal voltage derived from the emitter in a comparator which is clocked by the pulse frequency of the emitter. After the comparator there is a control voltage generator with an integration stage for a control member which controls the output amplitude of the receiver, and an evaluation logic stage to which alarm generators and an adaptation indicator are connected.

It is the object of the invention to provide a circuit arrangement of the type as discussed initially but which has substantially reduced energy requirements.

SUMMARY OF THE INVENTION

In a circuit arrangement for analyzing a clocked signal reflected from an object, particularly an optical signal, comprising at least one radiation emitter which, for providing the clocked signal, is connected to a clocking signal generator, at least one radiation receiver which receives radiation pulses emitted by the radiation emitter and reflected from the object, and a comparator by means of which the output signal pulses of the radiation are compared with reference pulses wherein the amplitude of the reference signal pulses depends on output signals of the comparator, the reference signal pulses occur concurrently with the radiation impulses received by the radiation receiver and the impulses received by the radiation receiver are compensated for each by a respective internal reference impulse.

Because the reference signal pulses occur time-wise concurrently with the radiation impulses received by the radiation receiver, it is advantageously achieved that during the pulse intervals of the signal received by the radiation receiver, there is no need for a comparison with the reference signal. It is therefore no longer necessary that the impulses received by the radiation receiver occur periodically. Furthermore, the radiation impulses received by the radiation receiver can be evaluated via a compensation method as it is provided in a particular embodiment of the invention. A compensation method offers big advantages as far as the circuitry is concerned. In addition, by the direct compensation of each radiation impulse received by the radiation receiver, the signal received by the radiation receiver can be evaluated particularly rapidly and reliably.

As a result, it is advantageously possible for example, that with small changes in the amplitude of the pulses reflected from the object and received by the radiation receiver, the time distance between the pulses emitted by the radiation emitter is increased. This is very advantageous with regard to the energy consumption of the circuit arrangement. In addition, disturbances which are outside the pulse duration have no influence. Furthermore, by the compensation of the individual impulses, the time requirements for achieving resonance are relatively low.

Particularly advantageous is an embodiment of the invention, wherein the reference signal pulses are generated in a controllable amplifier whose signal input is connected to the clocking device and whose control input is connected to the output of the controller. Such a compensation circuit can be realized very easily and operates reliably. In particular, such a circuit arrangement can be realized advantageously with digital building components. Furthermore, with such an embodiment an sender for generating the reference signal pulses can be omitted.

Since the signal input of the controllable amplifier is connected to the clocking signal generator a signal is applied to the output of the controllable amplifier which, except for travel times, corresponds as far as time is concerned with the signal provided by the clocking generator and, consequently, with the signal sent out by the radiation emitter and the signal received by the radiation receiver. When the amplitude of the signal pulse provided by the controllable amplifier from the amplitude of the impulse provided by the controllable amplifier from the amplitude of the impulse provided by the radiation receiver, a signal is present at the output of the comparator. From this signal in the controller a signal is formed which causes the amplification of the controllable amplifier to be adjusted in such a way that the output signal of the comparator becomes zero. As a result, the signal present at the control input of the controllable amplifiers can be used for determining the height of the amplitude of the impulse which was reflected from the object and received by the radiation receiver.

A particular embodiment of the invention, wherein an impedance with a capacity which is a multiple of the capacity of the radiation receiver and with an ohmic resistance which is a fraction of the ohmic resistance of the radiation receiver, is arranged parallel to the radiation receiver has been found to be very advantageous.

With this arrangement, the influence of the changes of the properties, or, respectively, the parameters of the radiation receiver are reduced so that the disturbances (static) which may be present have little effect. Furthermore, with the impedance and a following amplifier, a filter can be formed by means of which the signal—static spacing can be increased.

In another special embodiment of the invention, the controllable amplifier includes a digital control input and the controller includes an upward/downward counter whose counting direction input is connected to the output of a flip-flop, whose setting and back-setting input is connected to the output of the comparator, wherein the clocking signal input of the flip flop and the clocking signal input of the counter are connected to the clocking signal generator.

Since the setting/back-setting input of the flip-flop is connected to the output of the comparator the output of the flip-flop is always low when, upon the occurrence of a clocking signal, the output signal of the comparator is smaller than the switching threshold of the flip-flop. If upon occurrence of a clocking signal, the output of the comparator is larger than the switching threshold of the flip-flop, the output of the flip-flop is high.

During the high-phase of the flip-flop, the counter counts upwardly; during the low phase of the flip-flop, the counter counts downwardly. Consequently, the counter counts upwardly as long as the output of the comparator is greater than the switching threshold of the flip-flop during the occurrence of a clocking signal. This is the case as long as the reference signal is smaller than the signal provided by the radiation receiver.

Since during the upward counting of the counter the output signal of the counter becomes larger, the amplification of the controllable amplifier is also increased. This results in an increase of the reference signal. This process continues until the reference signal is larger than the signal provided by the radiation receiver. Then the procedure described reverses and the counter counts downwardly, whereby its output signal becomes smaller. As a result, the amplification of the controllable amplifier becomes smaller which in time has the result that the amplitude of the reference signal becomes smaller. When the reference signal is again smaller than the signal provided by the radiation receiver the procedure reverses again. Consequently, a state is established wherein the output of the counter changes about a certain value.

An embodiment of the invention, wherein, during a cycle of the clocked signal of the radiation emitter, the counter includes several counter clockings depending on the change of the amplitude of the output signal impulse of the radiation receiver. In this way, it is advantageously possible to react to large changes of the signal received by the radiation receiver. By the several counter clockings per cycle of the clocked signal of the radiation emitter, the output signal of the counter changes faster so that a new equilibrium state is more rapidly established. The dynamics of the circuit arrangement therefore have increased.

Particularly advantageous is also an embodiment of the invention wherein the counter is adjustable in advance to a particular counter state depending on a particular event. In this way, an equilibrium state can also be reached more rapidly. For example, upon switching on the circuit arrangement, the counter may be pre-adjusted to the value, which it had when the circuit arrangement was shut down. In this way, immediately after switching the circuit arrangement on, the circuit arrangement is in the state in which it was before it was switched off so that it becomes possible to utilize the evaluation part of the circuit arrangement in a polling method for several sending and receiving diode arrangements.

With the circuit arrangement according to the invention, it is advantageously also possible to determine the attenuation of an optical transmission path. Furthermore, the position of the object on a predetermined path not normal to the line sender-receiver can be determined.

The invention will become more readily apparent from the following description of a particular embodiment thereof described below with reference to the accompanying drawings.

DESCRIPTION OF A PREFERRED EMBODIMENT

Figure 1:
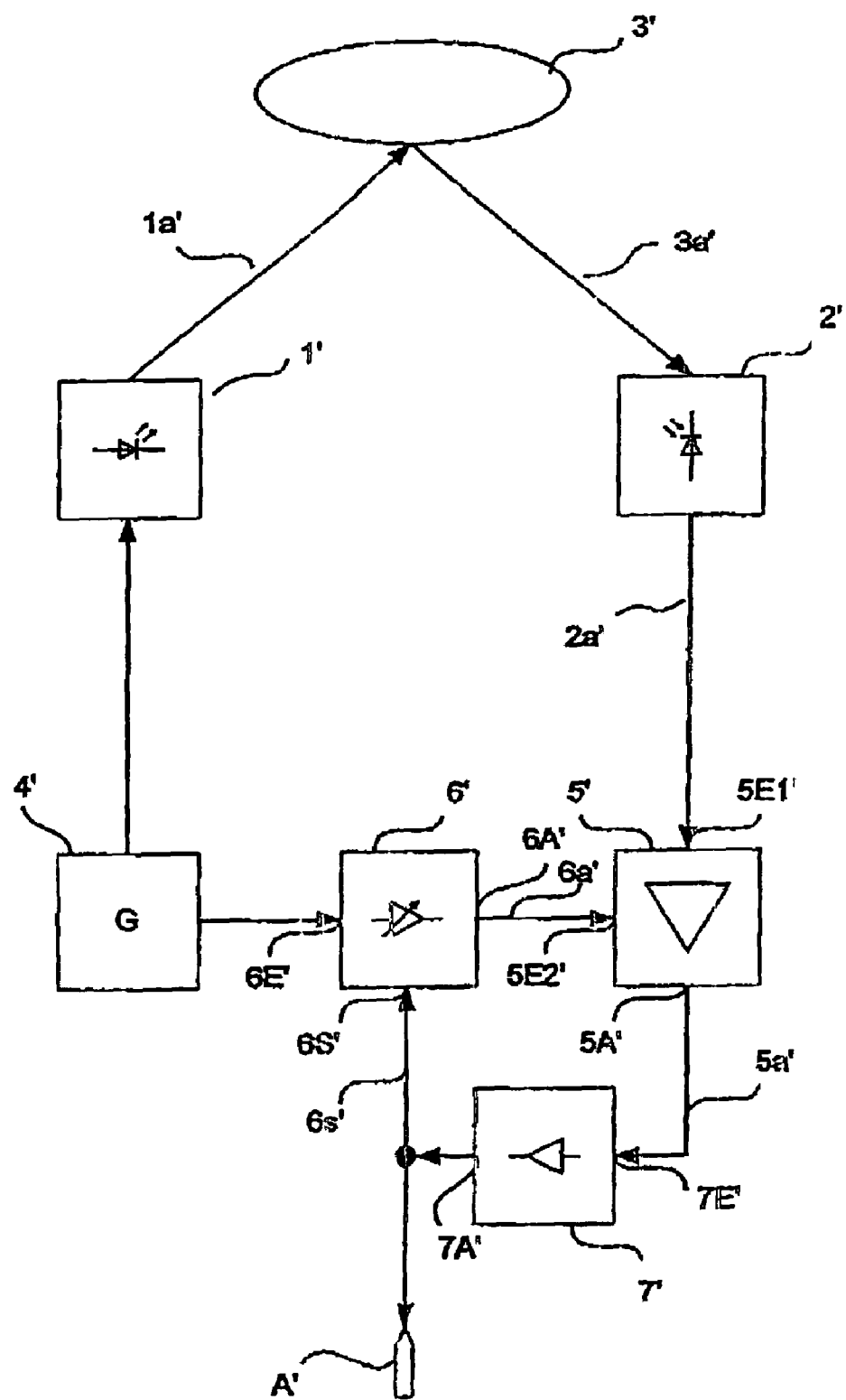
FIG. 1 shows a block diagram of a first embodiment of a circuit arrangement according to the invention.

As apparent from FIG. 1, a radiation emitter formed by an infrared emitter diode 1' is connected to a clocking generator 4'. With the application of an output impulse of the clocking signal generator 4' to the infrared emitter diode 1', the emitter diode 1'emits a light impulse 1a'. The light impulse 1a' is reflected form an object 3'. The light impulse 3a' reflected from the object 3' is converted by a radiation receiver 2' in the form of an infrared receiver diode 2' into an electrical signal 2a'.

The output signal 2a' of the receiver diode 2' is applied to the first input $5E_1$' of a comparator 5'. A second input $5E_2$' of the comparator 5' is connected to the output 6a' of a controllable amplifier 6'. The input 6E' of the controllable amplifier

6' is connected to the clocking signal generator 4'. The control input 6S' of the controllable amplifier 6' is connected to the output 7A' of a controller 7'. The input 7E' of the controller 7 is connected to the output 5A' of the comparator 5'.

The comparator 5', the controllable amplifier 6' and the controller 7' are so designed that the amplification of the controllable amplifier 6' is adjusted by means of the controller 7' based on the output signal 5a' of the comparator 5' in such a way that the signal present at the second input 5E$_2$' of the comparator 5' is as high as the signal present at the first input 6E' of the comparator 5'. This means that the output signal 5a' of the amplifier 6' is controlled to zero except for a control deviation. The signal required herefor at the control input 6S' of the controllable amplifier 6' therefore represents a measure for the light signal reflected from the object 3' and received by the electrode 2'. It is applied consequently to an output A' of the control circuit arrangement.

If the distance of the object 3' from the emitter diode 1', or respectively, the receiver diode 2' changes, the signal 3a' reflected from the object 3' changes. As a result, an output signal 5a' occurs at the output 5A' of the comparator 5' which causes a change in the amplification of the controllable amplifier 6' with the effect that the output signal 6a' of the amplifier 6' is adapted to the output signal 2a' of the receiver diode 2'. The signal 6s' required for establishing the new amplification of the amplifier 6' is a measure for the new distance of the object 3' from the emitter diode 1' or respectively the receiver diode 2'.

Since the light impulses 3a' received by the receiver diode 2' are directly compared with the reference signal impulses 6a' except for travel time differences, the impulse gaps of the emitter signal 1a' are not important for the evaluation of the reflected signal 3a'. The radiation impulses 1a' emitted from the emitter diode 1' therefore do not need to occur periodically. Depending on the particular application, the radiation impulses may be generated sporadically or at a very low frequency. With a changing distance of the object 3' from the emitter diode 1' or the receiver diode 2', the radiation impulses 1a' can be generated with a correspondingly higher frequency.

Figure 2:
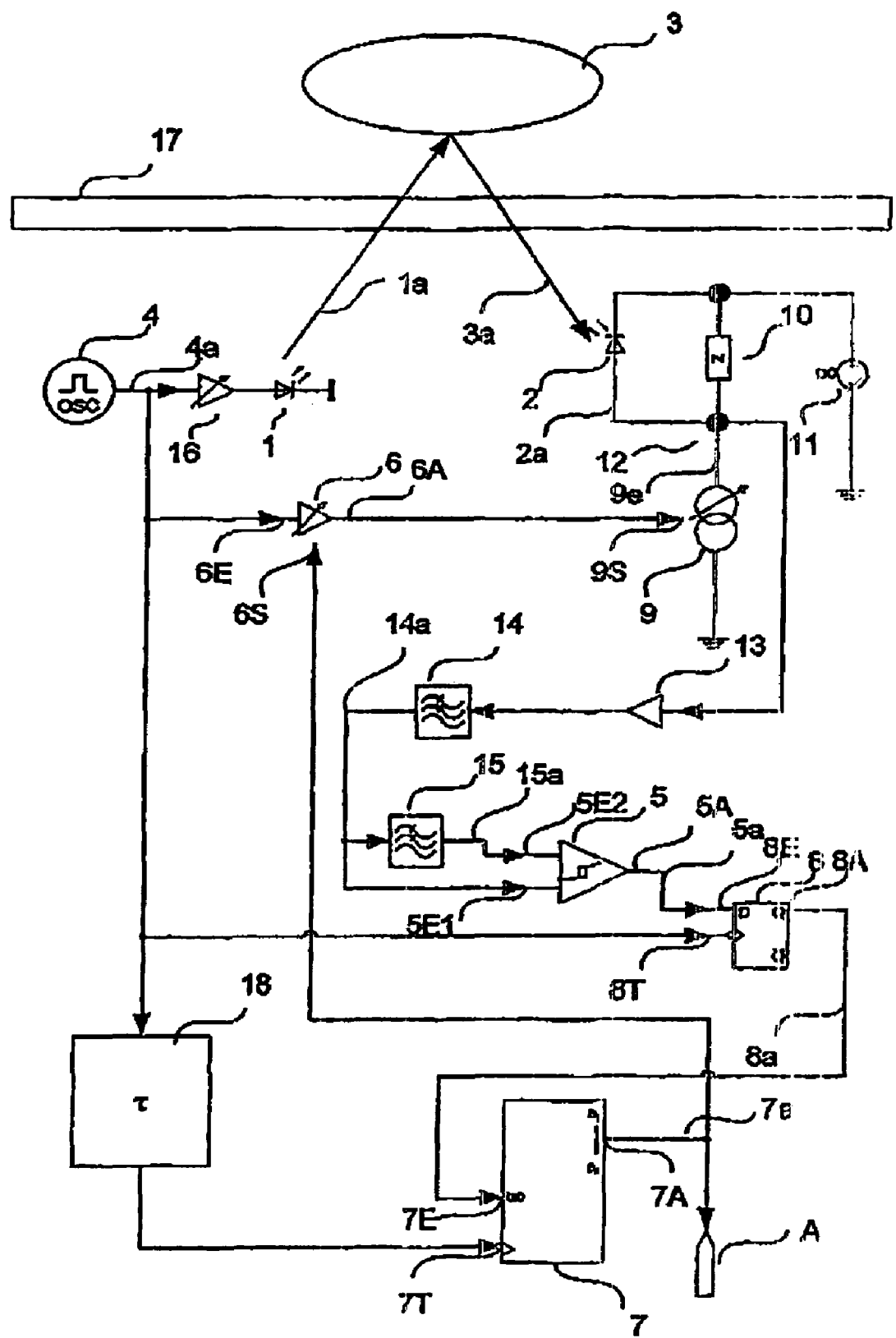
FIG. 2 shows a schematic arrangement of a second embodiment of a circuit arrangement according to the invention.

The circuit arrangement shown in FIG. 2 has basically the same function as the circuit arrangement shown in FIG. 1. However, it includes functional groups which are shown partially in a more detailed manner.

As apparent from FIG. 2, a clocking signal generator 4 is connected to a controllable amplifier 16 which supplies current to an infrared light emitter diode 1. The light signal 1a emitted from the infrared emitter diode 1 is reflected from an object 3 which is arranged on the opposite side of a plate 17 consisting of a transparent material. The light signal 3a reflected from the object 3 reaches an infrared receiver diode 2. The infrared receiver diode 2 is operated by a DC voltage source Ii in blocking direction. Parallel to the infrared receiver diode 2, a resistor 10 is arranged whose capacity is a multiple of the capacity of the infrared receiver diode 2 and whose ohmic resistance is a fraction of the ohmic resistance of the infrared receiver diode 2.

At the side remote from the DC source 11, the infrared receiver diode 2 and the resistor 10 are connected to a controllable current source 9. The voltage occurring at the current jointures 12 formed thereby is applied to the input of an amplifier 13. The output of the amplifier 13 is connected to the input of a first low pass 14. The first low pass 14 is so designed that, with respect to the square impulse provided by the clocking signal generator 4 and converted by the infrared receiver diode 2 into a voltage because of the impedance 10, it acts as an integrator whereby, at the output of the first low pass 14, a triangular voltage curve is provided.

The output of the first low pass 14 is connected on one hand to a second low pass 15, which is generated from the triangular output signal of the first low pass 14 a DC voltage and, on the other hand, directly to the first input 5E$_1$ of a comparator 6. The output of the second low pass 15 is connected to the second input 5E$_2$ of the comparator 5.

The output 5A of the comparator 5 is connected to the setting/resetting input 8E of a flip-flop 8. The clocking input 8T of the flip-flop effective on a negative flank is connected to the clocking signal generator 4. The output 8A of the flip-flop 8 is connected to the count-direction input 7E of an upward/downward counter 7. The clocking signal input 7T of the upward/downward counter 7 which is effective on a negative flank is connected to the clocking signal generator 4 via a delay member 18. The output 7A of the upward/downward counter 7 is connected to the control input 6S of a controllable amplifier 6. The input 6E of the controllable amplifier 6 is connected to the clocking signal generator 4. The output 6A of the controllable amplifier 6 is connected to the control input 9S of the controllable current source 9. Furthermore, the output 7A of the upward/downward counter 7 is connected to an output A of the circuit arrangement.

Figure 3:
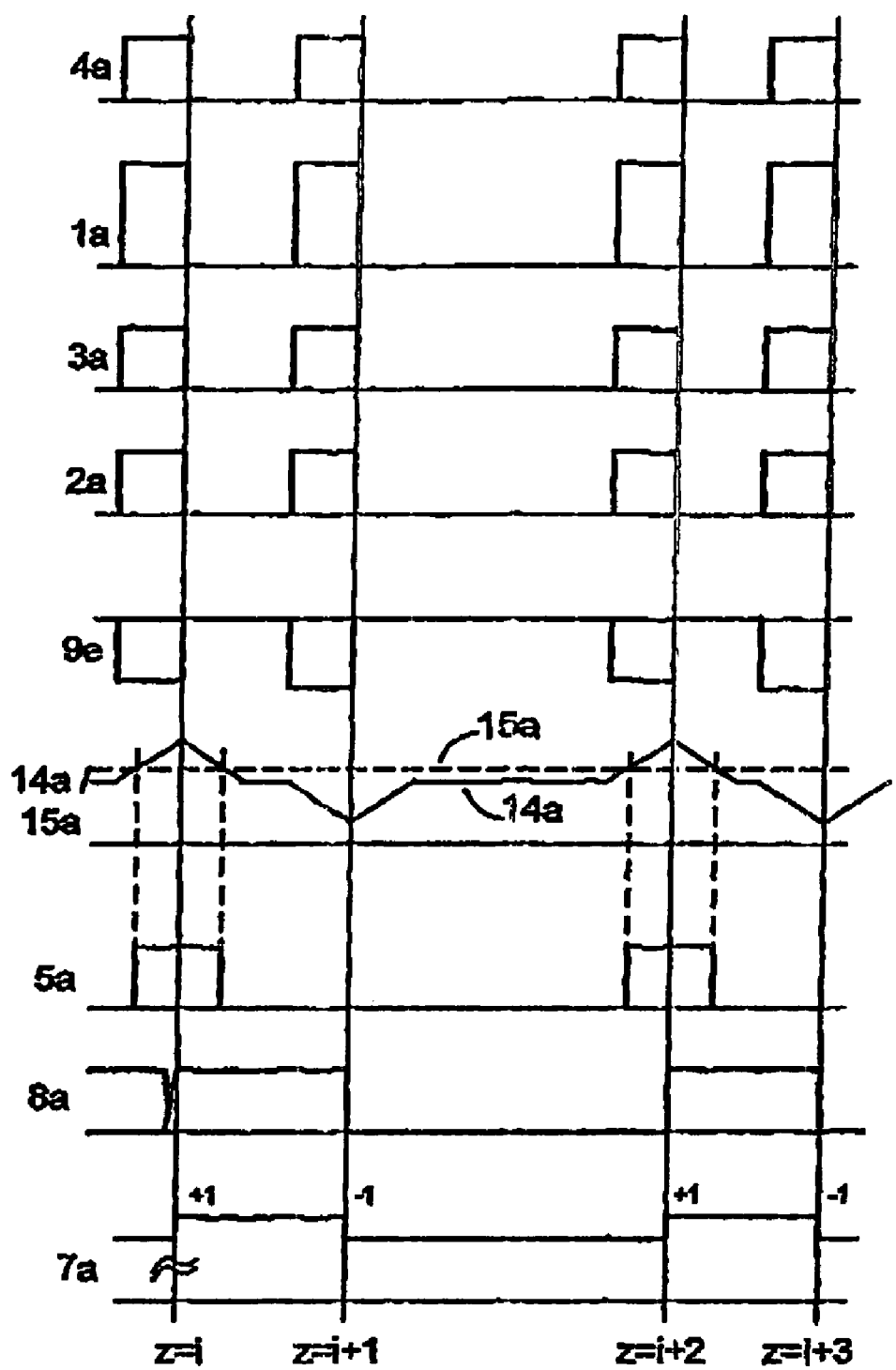
FIG. 3 shows some signal curves of the circuit arrangement shown in FIG. 2 with the circuit arrangement being in an operating state.

The operation of the circuit arrangement will now be explained with the aid of the signal curves shown in FIGS. 3 and 4.

The output signal 4a of the clocking signal generator 4 consists of pulses occurring with irregular spacing. On the basis of these pulses the infrared emitter diode 1 emits light impulses 1a, which pass through the transparent pane 17 and are reflected from the object 3. The impulses 3a reflected from the object 3 have a lower amplitude than the impulses 1a provided by the infrared emitter diode 1. The amplitude of the light impulses 3a received by the infrared receiver diode 2 depends on the distance of the object 3 from the infrared emitter diode 1 or, respectively, the infrared receiver diode 2.

The light impulses 3a reflected from the object 3 cause the infrared receiver diode to provide a pulse-like signal current 2a.

With the pulse-like signal current 2a, a corresponding voltage is generated at the current jointure 12. This almost square voltage is amplified by the amplifier 13 and integrated by the first low pass 14, whereby at the output of the first low pass 14 an inclined flank of a triangular signal curve 14a is generated. The triangular signal curve 14a is integrated by the second low pass 15, whereby at the output of the second low pass 15, a DC voltage signal 15 is provided whose value depends on the amplitude of the square signal applied to the first low pass 14 and consequently on the amplitude of the reflected light signal 3a.

The DC signal 15a provided by the second low pass 15 forms a threshold voltage for the comparator 5. If the value of the triangular signal 14a provided by the first low pass 14 exceeds this threshold voltage the comparator 5 switches whereby a positive signal 5a is provided at its output. Because of the positive signal 5a, the output 8A of the flip-flop 8 becomes positive when the impulse 4a provided the clocking signal generator has its negative flank. With the positive output signal 8a of the flip-flop 8, the counting direction of the upward/downward counter 7 is upwardly, whereby the output signal 7a of the upward/downward counter 7 is, with the occurrence of the next negative flank at its clocking input 7T, increased by a certain value. Since the clocking signal 4a of the clocking signal generator present at the clocking signal input 7T of the upward/downward counter 7 is somewhat delayed by the delay member 18, the count 7A switches at the same negative flank of the output impulse 4a of the clocking signal generator at which the flip-flop 8 is switched.

The output signal 7a of the upward/downward counter 7 adjusts the controllable amplifier 6 to a certain amplification whereby a certain current is supplied to the controllable current source 9. The current 9a is so selected that it compensates the signal current 2a of the infrared receiver diode 2 except for a small control deviation, which is amplified by the amplifier 13.

After the impulse of the clocking generator 4 is completed no further signal is received by the receiver diode 2 whereby, as a result, no voltage is present anymore at the first low pass 14. The output signal 14a of the first low pass 14 reverses therefore its direction that is, the negative flank of the triangle begins. When the output signal 14a of the first low pass 14 drops below the threshold value 15a, the output voltage 5a of the comparator 5 becomes zero.

The increase of the output signal 7a of the upward/downward counter 7 results in an over-compensation of the signal current 2a if the distance of the object 3 from the infrared emitter diode or, respectively, the infrared receiver diode remains unchanged. As a result, with the next light impulse received by the infrared receiver diode 2 the current flow through the impedance 10 is reversed whereby the voltage at the current junction 12 with respect to the operating point is reversed. This voltage is again amplified by the low pass amplifier 13 and is integrated in the low pass 14, whereby the triangular output signal 14a of the low pass 14 has a negative flank. Since the voltage curve of the output signal 14a of the first low pass 14 is below the threshold voltage 15a, the output signal 5a of the comparator 5 is zero. Since, as a result, the signal present at the input 8E of the flip-flop is below the threshold of the flip-flop 8, the output 8A of the flip-flop 8 becomes zero, when the impulse 4a provided by the clocking signal generator 4 has its negative flank. Since, as a result, the signal 8a present at the count direction input 7E of the upward/downward counter 7 is below the switch threshold of the upward/downward counter 7 the output signal 7a of the upward/downward counter 7 is reduced by a certain value, when the impulse 4a provided by the clocking signal generator 4 has its negative flank, whereby the switching procedure of the upward downward counter 7 occurs somewhat delayed by the delay member 18.

The reduction of the output signal 7a of the upward/downward counter 7 provides again for an under compensation of the signal current 2a while the distance of the object 3 from the infrared emitter diode 1 or, respectively, the infrared receiver diode 2 is unchanged. The current flow through the resistor 10 therefore again reverses its direction with respect to the operating point, that is, it flows again in the direction in which it was previously flowing. Therefore at the current juncture 12, there is again a square voltage with a positive amplitude whereby, at the output of the first low pass 14, again a triangular signal curve with a positive flank is formed.

The procedure described above is constantly repeated while the distance of the object 3 from the infrared emitter diode 1, or respectively, the infrared receiver diode 2 remains unchanged. That means that the output signal 7a of the upward/downward counter 7 varies about a certain value.

Figure 4:
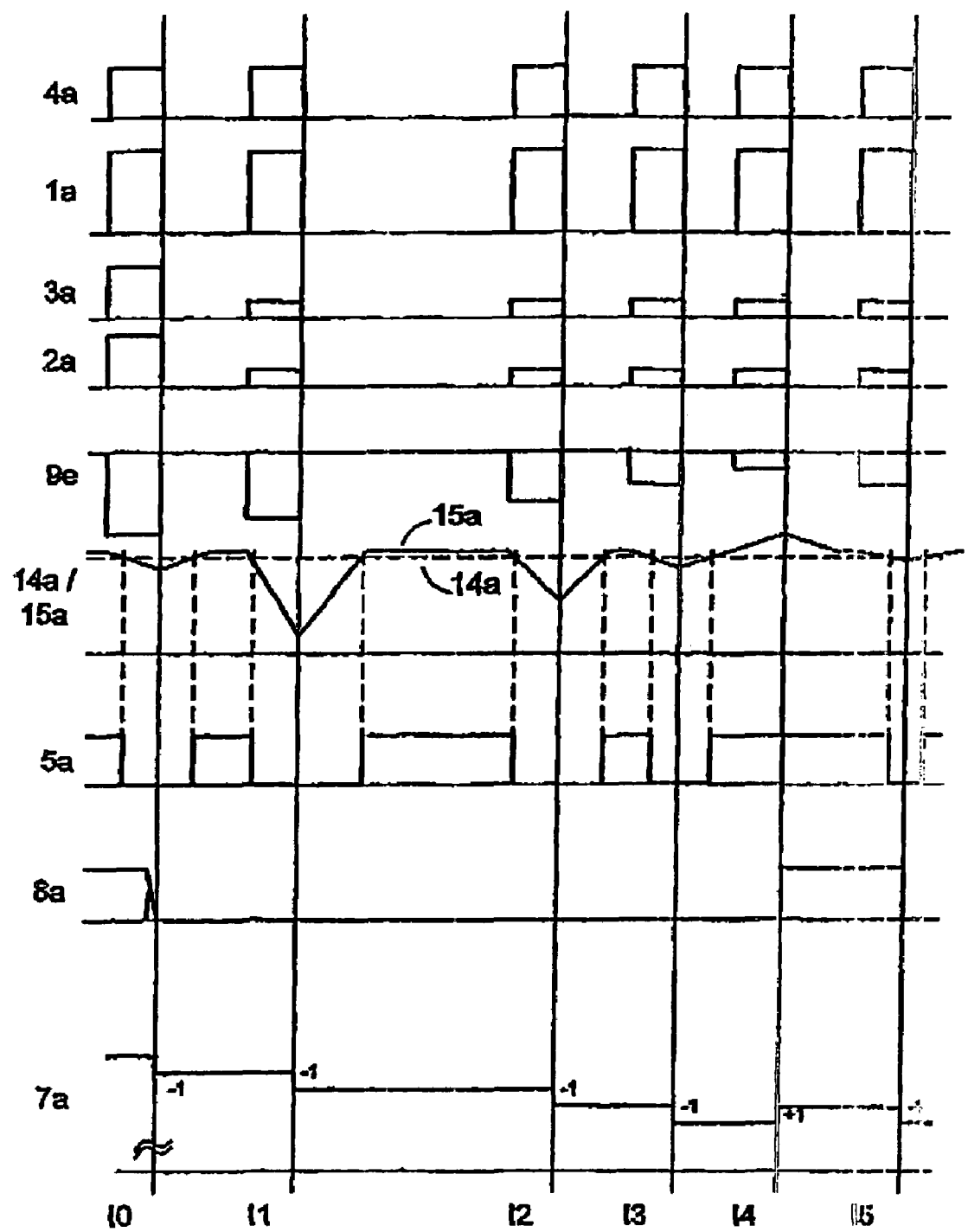
FIG. 4 shows the signal curves of FIG. 3 during a change of the reflection signal.

When the distance of the object 3 from the infrared emitter diode or respectively the infrared receiver diode 2 changes, then also the reflection signal 3a changes as it is shown in FIG. 4. With a greater distance, the reflection signal 3a becomes smaller which results in an overcompensation of the signal current 2a of the infrared receiver diode 2. As explained earlier, this results in a negative flank of the triangular output signal 14a of the low pass 14. As a result, the output signal 5a of the comparator 5 is zero whereby the upward/downward counter 7 reduces its output signal 7a at the negative flank of the output impulse 4a delivered by the clocking signal generator 4 by a certain value.

Although, by the reduction of the output signal 7a of the upward/downward counter 7 by a certain value, the over-compensation of the signal current 2a of the infrared diode 2 is reduced to some degree, it still remains. Consequently, with the next clocking signal 4a of the clocking signal generator 4, the triangular output signal 14a of the first low pass 14 has again a negative course. As a result, the output signal 7a of the upward/downward counter 7 is further reduced by a certain value. This process continues until there is no longer an over-compensation of the signal current 2a of the infrared receiver diode 2. Then the current flow through the impedance 10 is reversed, whereby at the current junction 12 a positive square voltage with respect to the operating point is present, which causes an increasing flank of a triangular signal at the output of the first low pass 14. This causes an increase of the output signal 7a of the upward/downward counter 7 by a certain value. Consequently, again the oscillation of the output signal 7 of the upward/downward counter 7 about a particular new value is established. This new value is a measure for the new distance of the object 3 from the infrared emitter diode 1 or, respectively, the infrared receiver diode 2.

Figure 5:
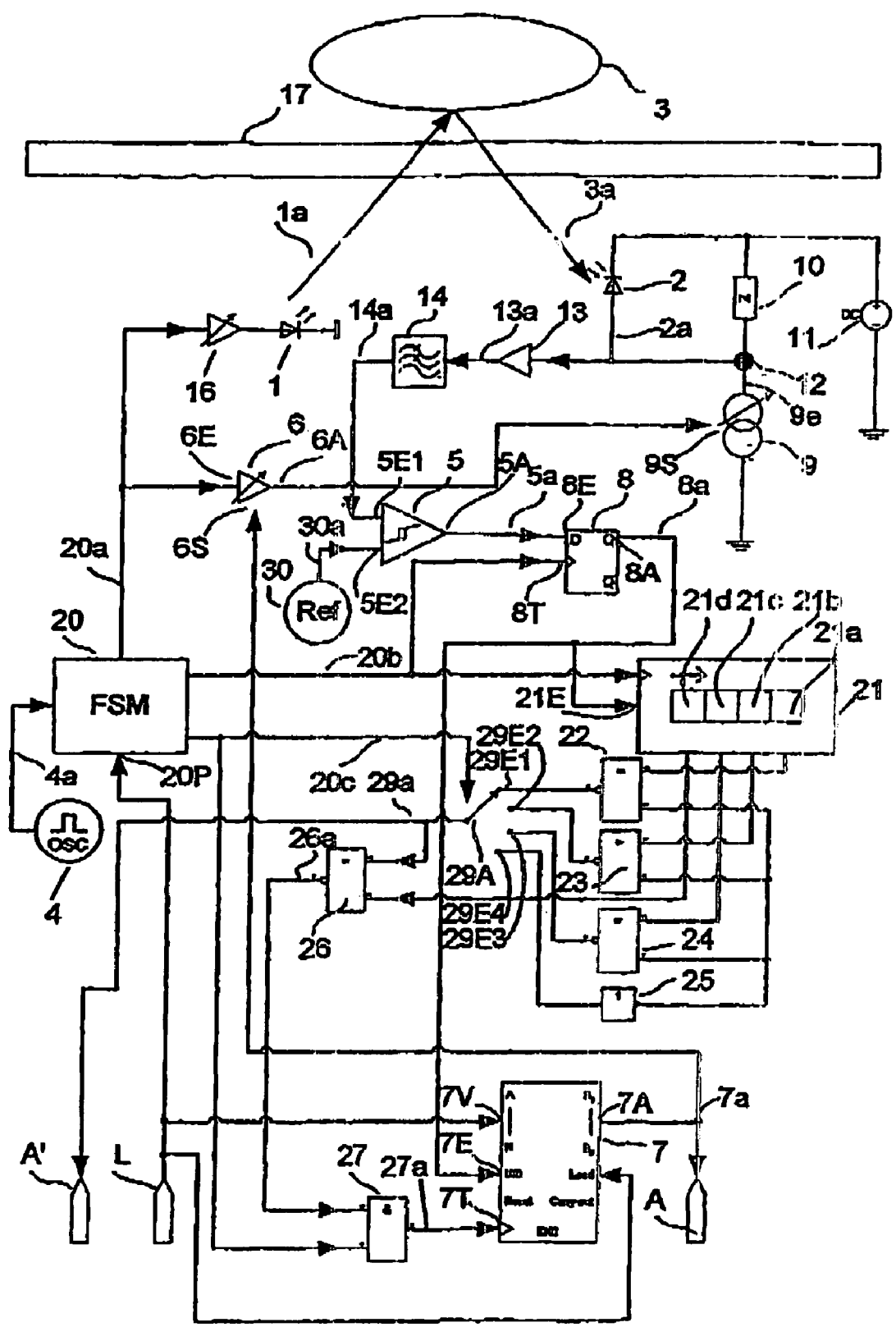
FIG. 5 shows a schematic arrangement of a third embodiment of the circuit arrangement according to the invention.

The circuit arrangement shown in FIG. 5 has, with respect to the circuit arrangement shown in FIG. 2, the advantage that it can more rapidly balance larger changes of the light impulses received by the infrared receiver diode 2, that is, distance changes of the object 3. Basically, however, it corresponds to the circuit arrangement shown in FIG. 2. In the description the same elements are therefore designated by the same reference numerals.

The circuit arrangement shown in FIG. 5 includes an oscillator 4, whose output signal 4a however is not supplied directly to an adjustable amplifier 16, which supplies current to an infrared emitter diode 1. Rather, the output signal 4a of the clocking signal generator 4 is supplied to a so-called finite state machine (FSM) 20 which generates different clocking signals 20a, 20b, 20c from the clocking rhythm of the clocking signal generator 4. The first signal 20a of the FSM 20 is used for controlling the adjustable amplifier 16 and, consequently, the infrared emitter diode 1.

The light signal 1a emitted by the infrared emitter diode 1a is reflected from an object 3 which is disposed on the other side of a plate 17 consisting of a transparent material. The light signal 3a reflected from the object 3 reaches an infrared receiver diode 2. The infrared receiver diode 2 is operated by a DC voltage source 11 in a blocking direction. Parallel to the infrared receiver diode 2, an impedance 10 is connected whose capacity is a multiple of the capacity of the infrared receiver diode 2 and whose ohmic resistance is a fraction of the ohmic resistance of the infrared receiver diode 2.

The reduction of the output signal 7a of the upward/downward counter 7 provides again for an under compensation of the signal current 2a while the distance of the object 3 from the infrared emitter diode 1 or, respectively, the infrared receiver diode 2 is unchanged. The current flow through the resistor 10 therefore again reverses its direction with respect to the operating point, that is, it flows again in the direction in which it was previously flowing. Therefore at the current juncture 12, there is again a square voltage with a positive amplitude whereby, at the output of the first low pass 14, again a triangular signal curve with a positive flank is formed.

The output of the low pass 14 is connected to the first input 5E, of a comparator 5. The second input 5E$_2$ of the comparator 5 is connected to a reference voltage source 30.

The output 5A of the comparator 5 is connected to the setting/resetting input 8E of a flip-flop 8. At the clocking input 8T of the flip-flop 8, the second output signal 20b of the FSM 20 is present. The output 8A of the flip-flop 8 is connected on one hand to the counting device input 7E of the upward/downward counter 7. On the other hand, the output 8A of the flip-flop 8 is connected to the input 21E of a 4 bit slide register 21.

At the clocking signal input 7T of the upward/downward counter 7, the third output signal 20c of the FSM 20 is present which is switched via an AND member 27. The output 7A of the upward/downward counter 7 is connected to the control input 6S of a controllable amplifier 6. Furthermore, the output 7A of the upward/downward counter 7 is connected to an output A of the circuit arrangement.

At the input 6E of the controllable amplifier 6, the first output signal 20a of the FSM 20 is present. The output 6A of the controllable amplifier 6 is connected to the control input 9S of the controllable voltage source 9.

The input of the AND member 27 which is not connected to the FSM 20, is connected to the negated output of a first exclusive OR-member (XNOR)26. The first input of the first XNOR member 26 is connected to the common output of a switch 29, which has four inputs 29E$_1$, 29E$_2$, 29E$_3$, 29E$_4$. Furthermore, the first input of the first XNOR26 and consequently the common output of the switch 29 is connected to a first connection A' of the circuit arrangement. The switch 29 is controlled by the third output signal 20c of the FSM 20.

The second input of the first XNOR 26 is connected to the last (left) Bit 21d of the slide register 21. To the clocking input of the slide register 21, the second output signal 20b of the FSM20 is applied. The first (right) Bit 21a of the slide register 21 is connected to the first input of a second XNOR 22. The second bit 21b of the slide register is connected to the first input of a third XNOR 23. The third bit 21c of the slide register 21 is connected to the first input of a fourth XNOR 24. The second input of the second XNOR 22, the second input of the third XNOR 23 and the second input of the fourth XNOR 24 are connected to the output of an inverter 25.

The input of the inverter 25 is connected to the fourth input 29E$_4$ of the switch 29 and also to the last bit 21d of the slide register 21 and to the second input of the first XNOR 26.

The inverting output of the second XNOR22 is connected to the first input 29E, of the switch 29. The inverting output of the third XNOR 23 is connected to the second input 29E$_2$ of the switch 29. The inverting output of the fourth XNOR 24 is connected to the third input 29E$_3$ of the switch 29.

The FMS 20 has an input 20P, which is connected to a second connection L of the circuit arrangement, and by means of which the second occurrence and the duration of its output signals can be programmed. The upward/downward counter 7 has a pre-adjustment input 7V, by which the count of the upward/downward counter 7 can be pre-set and which is also connected to the second connection L of the circuit arrangement.

The operation of the circuit arrangement will be explained below:

The output signal 4a of the clocking signal generator 4 is supplied to the FSM 20 in which the clocking signals 20a, 20b, 20c required for the operation of circuit arrangement are generated. If a change of the clocking signals required of the operation of the circuit arrangement is desired the change can be achieved by way of the second input 20P which is connected to the second connection L.

The first output signal 20a of the FSM 20 reaches, via the adjustable amplifier 16, the infrared emitter diode 1, which as a result emits light impulses 1a. The light impulses 1a pass through the transparent pane 17 and are reflected by the object 3. The light impulses 3a reflected from the object 3 reach the infrared receiver diode 2. The amplitude of the reflected impulses 3a depends on the distance of the object 3 from the infrared emitter diode 1, or respectively, the infrared receiver diode 2.

The light impulses 3a received by the infrared receiver diode 2 cause a pulse-like signal current 2a to be generated in the receiver diode 2. With the pulse-like signal current, a corresponding voltage occurs at the current junction 12 this almost square voltage is amplified by the amplifier 13 and integrated by the low pass 14, whereby, with a positive amplitude of the square signal 13a provided by the amplifier 13, the increasing flank of a triangular signal curve 14a is formed at the output of the low pass 14.

The output signal 14a of the low pass 14 is compared in the comparator 5 with the threshold voltage 30a of the reference voltage source 30. If the value of the output signal 14a of the low pass 14 exceeds the threshold voltage 30a, the comparator 5 switches whereby a positive signal 5a is provided at its output.

As a result of the positive signal 5a, the output 8A of the flip-flop 8 becomes positive with the next increasing flank of the second output signal 20b of the first FSM 20. With the positive output signal 8a of the flip-flop 8, the counting direction of the upward/downward counter 7 is positive whereby the output signal 7a of the upward/downward counter 7 is increased by a certain value with the next positive flank of the output signal 27a provided by the AND member 27.

The output signal 7a of the upward/downward counter 7 provides at the controllable amplifier 6 for a certain amplification whereby a certain current 9e flows through the controllable current source 9. The current 9e is so selected that it completely compensates for the signal current 2a of the infrared receiver diode 2 except for a small control deviation which is amplified by the amplifier 13. In this way, changes of the properties of the infrared receiver diode 2 affect equally high amplitude signals as well as low amplitude signals and the rest signal.

When the pulse of the first output signal 20a of the FSM 20 is completed the infrared emitter diode 1 no longer emits light. The infrared receiver diode 2 consequently no longer receives any signal so that, as a result, no voltage is applied to the low pass 14. The output signal 14a of the first low pass 14 therefore reverses its direction, that is, the negative flank of the triangle starts. If the output signal 14 of the low pass 14 drops below the threshold value 30a the output voltage 5a of the comparator 5 becomes zero.

The increase 7a of the upward/downward counter 7 causes, with an unchanged distance of the object 3 from the infrared emitter diode 1 or, respectively, the infrared receiver diode 2, an overcompensation of the signal current 2a. As a result, with the next light impulse received by the infrared receiver diode 2, the current flow through the resistor 10 is reversed, whereby the voltage present at the current junction 12 is reversed with respect to the operating point. This voltage is again amplified by the amplifier 13 and integrated in the low pass 14, whereby the triangular output signal 14a of the low pass 14 has a negative flank. As soon as the voltage curve of the output signal 14a of the first low pas 14 is below the threshold voltage 30a, the output signal Sa of the comparator 5 is zero. Since, as a result, the signal present at the input 8E of the flip-flop 8 is below the switching threshold of the first flip-flop 8, the output 8A of the first flip-flop 8 becomes zero, when the second output signal 20b of the FSM 20 has an impulse. Since, as a result, the signal Ba present at the counter input 7E of the upward/downward counter 7 is zero, the output signal 7a of the upward/downward counter 7 is reduced by a certain value, when the second output signal 20b of the FSM 20 has an impulse.

With the reduction of the output signal 7a of the upward/downward counter 7, the signal current is again under-compensated when the distance of the object 3 from the infrared emitter diode 1 or, respectively, the infrared receiver diode 2 of the signal current 2a is unchanged. The current flow through the resistor 10 therefore reverses its direction with respect to the operating point, that is, the current flows again in the direction in which it was first flowing. As a result, with respect to the operating point, a square voltage with a positive amplitude is again present at the current junction 12, whereby at the output of the first low pass 14 again a triangular signal curve with a positive flank is formed.

The procedure described above is constantly repeated which the distance of the object 3 from the infrared emitter diode 1 or, respectively, the infrared receiver diode 2. This means that the output signal 7a of the upward/downward counter 7 constantly changes around a certain value.

The operation as described above corresponds to the operation as represented by the circuit arrangement of FIG. 2.

The operation of the circuit arrangement shown in FIG. 5 will now be described for a large amplitude change of the signal 3a received by the infrared receiver diode 2 on the basis of the signal curves shown in FIG. 6.

Figure 6:
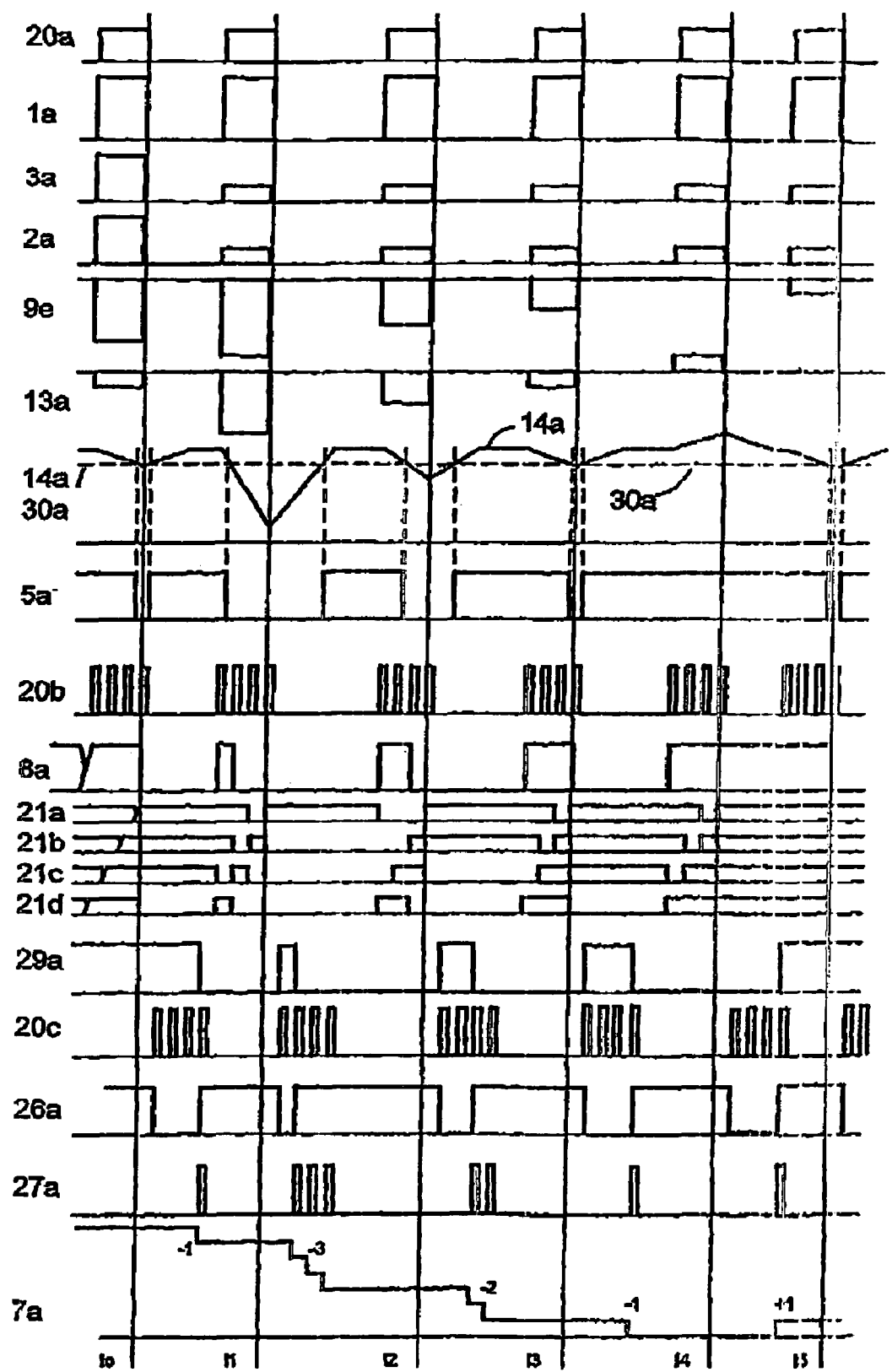
FIG. 6 shows some signal curves of the circuit arrangement shown in FIG. 5.

For the signal curve shown in FIG. 6, there is in the interval $I_o$ an overcompensation of the signal current 2a of the infrared receiver diode 2 by the current 9e of the controllable current source 9. As a result, a negative square signal 13a is present at the input of the low pass 14 and the output signal 14a of the low pass 14 has a negative flank. Shortly before the end of the pulse duration of the first output signal 20a, the FSM 20 and, consequently, the square signal 13a present at the input of the low pass 14, the output signal 14a of the low pass 14 drops below the threshold voltage 30a of the reference voltage source 30. As a result, the output signal 5a of the comparator 5 becomes zero whereby the flank of the output signal 14a of the low pass 14 is reversed.

The output signal 14a of the low pass 14 rises until it has reached a value which is dependent on the ambient light received by the infrared receiver diode 2. Although the increase occurs in accordance with an exponential function, it has been shown in FIG. 6 as the increasing flank of a triangle for reasons of representation. When the output signal 5a of the comparator 5 exceeds the threshold voltage 30a of the reference voltage source 30, the output signal 5a of the comparator 5 becomes positive. The output signal 5a of the comparator 5 remains positive until the output signal 14a of the low pass 14 is again below the threshold voltage 30a of the reference voltage source 30. This will be the case when the infrared receiver diode 2 receives the next light impulse 3a (interval $I_1$). Because, by the still present overcompensation of the output signal 2a by the signal 9c of the current source 9, the output signal 13a of the amplifier 13 is still negative, the output signal 14a of the low pass 14 has the begin of a negative flank.

In the interval I, the distance of the object 3 from the infrared receiver diode has become much greater and the signal current 2a of the infrared receiver diode is highly over-compensated by the current 9e of the controllable current source 9. Because of the relatively large overcompensation the flank of the output signal 14a of the low pass 14 is steep. As a result, the output signal 14a of the low-pass 14 drops below the threshold voltage 30a of the reference voltage source 30 immediately after being exposed to the light impulse 3a, so that the output signal 5a of the comparator 5 becomes zero immediately after the occurrence of the light impulse 3a. The greater the over-compensation of the output signal 2a of the infrared receiver diode 2, the faster drops the output signal 14a of the low pass 14 below the threshold voltage 30a of the reference voltage source 30 and the longer is the output signal 5a of the comparator zero. If the overcompensation of the output signal 2a of the infrared receiver diode 2 is only small or if there is an under-compensation, the output signal 5a of the comparator is positive very long or uninterruptedly until an over-compensation occurs again.

The output signal 5a of the comparator 5 is determined by means of the second output signal 20b of the FSM 20 and the result of the determination is written into the slide register 21. The interposition of the flip-flop 8 in the circuit is of no importance in this connection.

The second output signal 20b of the FSM 20 consists of a series of four impulses which occur time-wise in such a way that the fourth impulse occurs in each case in connection with the decreasing flank of an impulse of the first signal 20a of the FSM 20. In this way, it is ensured that the fourth pulse of the second output signal 20b of the FSM 20 occurs in each case at the tip of the triangular output signal 14a of the low pass 14 and the three preceding signals of the second output signal 20b of the FSM 20 occur in each case during an increasing positive or negative flank of the output signal 14a of the low pass 14.

Since, because of the large over-compensation of the output signal 2a of the infrared receiver diode 2, the output signal of the low pass 14 has a steeper flank whereby the comparator 5 switches immediately after the occurrence of a light impulse 3a received from the infrared receiver diode 2, the input 21E of the slide register 21 is positive only with the first impulse of the second output signal 20b of the FSM 20 whereby only the first (right) bit 21a of the slide register 21 is one and the remaining bits 21b, 21c, 21d are zero. This again has the result that the comparison of the bits performed by means of the switch 29 in the tact of the impulse of the third output signal 20c of the FSM 20 in the first XNOR 26 has the result that the output signal 26a of the first XNOR 26 is zero in the first position of the switch 29 (first input 29E, connected to the output 29A), is one in the second position of the switch 29 (second input $29E_2c$ connected to the output 29A), is one in the third position of the switch 29 (third input $29E_3$ connected to the output 29A) and is one in the fourth position of the switch 29 (fourth input 21E, connected to the output 29A).

Since the output signal 26a of the first XNOR 26 causes in the AND member 27, that the third output signal 20c of the FSM20 is permitted to pass or, respectively, is blocked, the output signal 27a of the AND member 27 includes the last three impulses of the third output signal 20c of the FSM 20. The upward/downward counter 7 counts therefore three impulses, whereby its output signal 7a is reduced by three values. As a result, the amplification of the controllable amplifier 6 is changed to a greater value than with the change of the output signal 7a of the upward/downward counter 7. In this way, the over-compensation of the output signal 2a of the infrared receiver diode 2 is also reduced to a greater degree.

With the over-compensation of the output signal 2a of the infrared receiver diode 2 being reduced, the amplitude of the square signal 13a present at the low pass 14 is also lower, whereby the flank of the output signal 14a of the low pass 14 is less steep. The smaller incline again has the result that the first output signal 20a of the FSM20 is not immediately upon its occurrence below the threshold value 5a of the reference voltage 30, but with some delay. The output signal 5a of the comparator 5 is therefore positive somewhat longer. In this way, with the occurrence of the next impulse series (interval I₃) of the second output signal 21b of the FSM 20, the values one, one, zero, zero are written into the slide register 21.

As a result, the comparison performed during occurrence of the series of impulses of the third output signal 20c of the FSM 20 in the interval I₃ of the bits 21a, 21b, 21c, of the slide register 21 with the left bit 21d of the slide register 21 with the left but 21d of the slide register causes that the output signal 20a of the first XNOR 26 is zero in the first position of the switch 29 (first input 29E₁ connected to the output 29A), is zero in the second position of the switch 29 (second input 29E₂ connected to the output 29A), is one in the third position of the switch 29 (third input 29E₃ connected to the output (29A), and is one in the fourth position of the switch 29 (fourth input 29E₄ connected to the output 29A).

In this way, two impulses reach the input 7T of the upward/downward counter 7 whereby the output signal 7a of the upward/downward counter 7 is lowered by two values. This again results in an improved adaptation of the compensation signal 9e to the output signal 2a of the infrared receiver diode 2 since the adaptation is greater than with the reduction of the output signal 7a of the upward/downward counter 7 by one value but less than with the reduction of the output signal 7a of the upward/downward counter 7 by three values.

Since with the last reduction of the output signal 7a of the upward/downward counter 7 by two values the over-compensation was again reduced but is still present, the amplitude of the square signal 13a present at the low pass 14 is not very large any more although it is still negative. As a result, the flank of the output signal 14a of the low pass 14 is only slightly inclined which again has the result that the output signal drops below the threshold value 5a of the reference voltage 30a only shortly before the end of the square pulse of the first output signal 20a of the FSM 20. The output signal 5a of the comparator 5 is consequently positive for a very long time. As a result, with the occurrence of the next impulse series (interval I₄) of the second output signal 21b of the FSM 20 the values one, one, one, zero are written into the slide register 21.

As a result, the comparison performed with the impulse series of the third output signal 20c of the FSM 20 occurring in the interval I₄ in the first XNOR 26 of the bits 21a, 21b, 21c, 21d of the slide register 21 with the left bit 21d of the slide register 21, the output signal 26a of the first XNOR 26 is zero in the first position of the switch 29 (first input 29E, connected to the output 29A) is zero in the second position of the switch 29 (second input 29E₂ connected to the output 29A), is zero in the third position of the switch 29 (third input 29E₃ connected to the output 29A) and is one in the fourth position of the switch 29 (fourth input 294 connected to the output 29A).

In this way, an impulse is applied to the input 7T of the upward/downward counter by which the output signal 7a of the upward/downward counter 7 is reduced by a certain value. As a result, the output signal 2a of the infrared receiver diode 2 is no longer over-compensated by the current 9E of the controllable current source 9 but under-compensated.

Therefore the output signal 13a of the amplifier 13 has a positive amplitude. The output signal 14a of the low pass 14 consequently has a positive flank whereby the output signal exceeds the threshold value 30a of the reference voltage source 30. The output signal 5a of the comparator 5 is therefore uninterruptedly positive. Upon occurrence of the next impulse series (interval I₅) of the second output signal 21b of the FSM20, the values one, one, one, one, are written into the slide register 21.

Since the fourth bit 21d of the slide register 21 is a one, a zero is present at the lower input of the second XNOR 22, the lower input of the third XNOR 23 and the lower input of the fourth XNOR 24. As a result, the signal present in each case at the upper input of the XNOR is inverted. At the first input 29E₁ of the switch 29 is therefore a zero, at the second input 29E₂ is a zero, at the third input 29E₃ is a zero and at the fourth input 29E₄ is a one. As a result, the output signal 26a of the first XNOR 26 is zero during an impulse series of the third output signal 20c of the FSM 20 in the first position of the switch 29 (first input 29E, connected to the output 29A), zero in the second position of the switch 29 (second input 29E₂ connected to the output 29A), zero in the third position of the switch 29 (third input 29E₃ connected to the output 29A) and one in the fourth position of the switch 29 (fourth input 29E₄ connected to the output 29A).

In this way, an impulse reaches the input 7T of the upward/downward counter 7 during the interval I₅, whereby the output signal 7a of the upward/downward counter 7 is increased by a value, since the output signal 8a of the flip-flop 8 is one. This again has the result that the output signal 2a of the infrared receiver diode 2 is over-compensated by the current 9E of the controllable current source 9. The output signal 7a of the upward/downward counter 7 therefore varies about this value. If the counter is not to vary in the statistical state but should remain constant for example the two left bits 21c and 21d of the slide register 21 may be used as count criterium as described below. The bit series zero, zero or one, one do not change the counter count. The bit series zero, one reduces the counter count and the bit series one, zero increases the counter count.

Since the output signal 7a of the upward/downward counter 7 is present at the output A of the circuit arrangement, at this output a measure for the distance of the object 3 from the transparent panel 17 can be derived. At the first connection 4', on the other hand, there is the output signal 29a of the switch 29, which is a measure for the distance change of the object 3. Consequently, from the first connection A' a measure of the speed with which the object 3 moves relative to the transparent pane can be derived. By means of the second connection L of the circuit arrangement on one hand, the FSM 20 can be programmed. On the other hand, the counter count of the upward/downward counter 7 can be pre-set by means of the second connections L.

What is claimed is:

1. A circuit arrangement for analyzing a clocked optical signal (3a', 3a) reflected from an object (3', 3), comprising at least one radiation emitter (1', 1) which, for providing the clocked signal (1a', 1a) is connected to a clocking signal generator (4', 4), at least one radiation receiver (2', 2) which receives radiation pulses (1a', 1a) emitted by the radiation emitter (1', 1) and reflected from the object (3', 3), a controllable amplifier (6', 6) having an input (6E', 6E) connected to the clocking signal generator (4', 4) and an output (6A' 6A) connected to a controllable power source (9) for controlling the strength of the output signal provided by the radiation receiver (2', 2), the circuit arrangement further comprising a comparator (5', 5, 12, 13, 14, 15) by means of which output signal pulses (2a', 2a) of the radiation receiver (2', 2) are compared with reference signal pulses (6a', 6a) of the controllable amplifier (6', 6), wherein the amplitudes of the reference signal pulses (6a', 6a) depend on output signals (5a', 5a) of the comparator (5', 5, 12, 13, 14, 15), the reference signal pulses (6a', 6a) being generated internally and occurring concurrently with the radiation optical signal (3a', 3a) received by the radiation receiver (2', 2) and the output signal pulses (2a', 2a) of the radiation receiver (2', 2) are compensated for each by the respective internal reference signal pulses (6a', 6a) before their analysis in the circuit arrangement.

2. A circuit arrangement according to claim 1, wherein the controllable amplifier (6', 6), has a control input (6S', 6S) which is connected to the output (7A'A) of a controller (7', 7) whose input (7E', 7E) is connected to the output (5A', 5A) of the comparator (5', 5, 12, 13, 14, 15).

3. A circuit arrangement according to claim 1, wherein, parallel to the radiation receiver (2), a resistor (10) is connected, whose capacity is a multiple of the capacity of the radiation receiver (2) and whose ohmic resistance is a fraction of the ohmic resistance of the radiation receiver (2).

4. A circuit arrangement according to claim 2, wherein the controllable amplifier (6) has a digital control input (6S) and the controller (7, 6) includes an upward/downward counter (7) whose counting direction input (72) is connected to the output (8A) of a flip-flop (8) whose setting/resetting input (8E) is connected to the output (SA) of the comparator (5), wherein the clocking input (82) of the flip-flop and the clocking input (7T) of the counter (7) are connected to the clocking signal generator (4).

5. A circuit arrangement according to claim 4, wherein the counter (7) receives several count clocking signals during a cycle of the clocked signal of the radiation emitter (1', 1) depending on the change of the amplitude of the output signal pulse (2a', 2a) of the radiation receiver (2', 2).

6. A circuit arrangement according to claim 5, wherein, depending on an event, the counter (7) is adjustable to a certain counter count.

\* \* \* \* \*